United States Patent [19]

Shestok et al.

[11] Patent Number: 4,778,735
[45] Date of Patent: Oct. 18, 1988

[54] STORAGE BATTERY GANG VENT CAP

[76] Inventors: Mark J. Shestok, 13 Unionville Rd., Douglasville, Pa. 19518; Gerald D. Hudack, 3109 Marcor Dr., Sinking Spring, Pa. 19608; Scott J. Cronrath, 219 Philadelphia Ave., Shillington, Pa. 19607

[21] Appl. No.: 130,420

[22] Filed: Dec. 9, 1987

[51] Int. Cl.$^4$ .................. H01M 2/12; H01M 2/04
[52] U.S. Cl. ........................... 429/82; 429/87; 429/88; 429/89
[58] Field of Search .............. 429/82, 84, 88, 89, 429/53, 86

[56] References Cited

U.S. PATENT DOCUMENTS

| | | | |
|---|---|---|---|
| 3,879,227 | 4/1975 | Hennen | 429/88 X |
| 4,002,495 | 1/1977 | Hakarine | 429/87 |
| 4,086,395 | 4/1978 | Heiser et al. | 429/88 |
| 4,098,963 | 7/1978 | Mocas | 429/88 |
| 4,168,350 | 9/1979 | Oxenreider et al. | 429/87 |
| 4,186,247 | 1/9180 | Mocas | 429/88 |
| 4,203,791 | 5/1980 | Heiser et al. | 156/252 |
| 4,233,370 | 11/1980 | Heiser et al. | 429/82 |
| 4,278,742 | 7/1981 | Oxenreider et al. | 429/88 |
| 4,286,028 | 8/1981 | Heiser et al. | 429/82 |
| 4,306,002 | 12/1981 | Heiser et al. | 429/84 |
| 4,315,058 | 2/1982 | Schwendener et al. | 429/89 X |
| 4,517,262 | 5/1985 | Beidler | 429/87 |
| 4,600,664 | 7/1986 | Cramer et al. | 429/88 X |

Primary Examiner—Anthony Skapars
Attorney, Agent, or Firm—Benasutti & Murray

[57] ABSTRACT

A gang vent cap for commonly venting a plurality of cell apertures of a storage battery in which a vent cap having a cover and a base which define a selectively configured hollow enclosure. A venting path is defined within the hollow enclosure which interconnects one or more battery cell ports with the venting port of the vent cap. Associated with each battery cell port of the vent cap is a projecting battery engaging member which sealingly engages one of the cell apertures of a storage battery. Each cell port includes a splashguard disposed between the battery cell and the cell port to retard the ingress of battery acid into the vent cap. A cylindrical condensation chamber is defined within the hollow enclosure above each cell port to trap and condense battery acid contained in the gases venting from the battery cell. Pathways defined within the vent cap include primary and secondary acid retention chambers, a corridor system and a venting chamber.

26 Claims, 4 Drawing Sheets

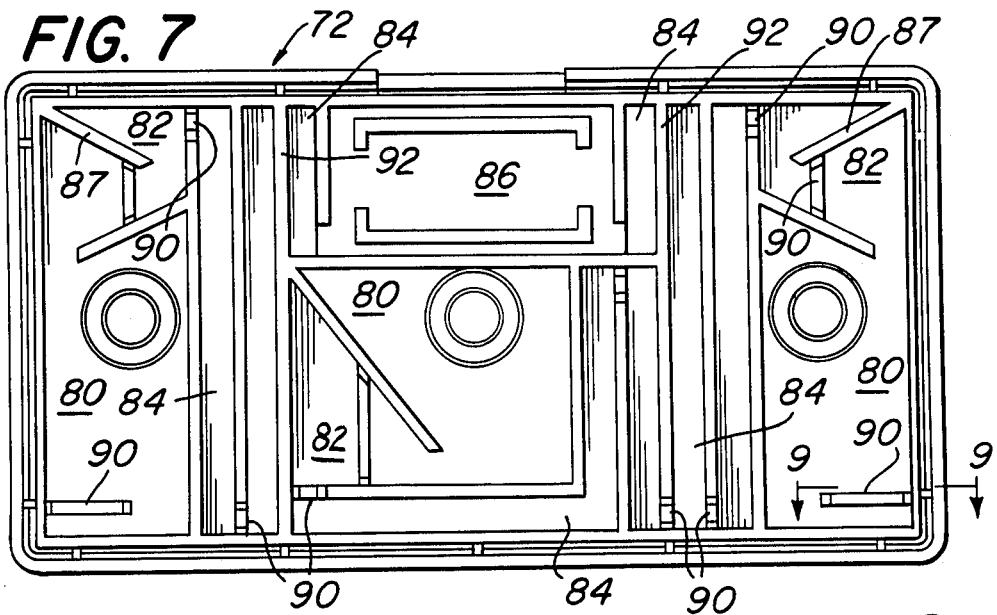
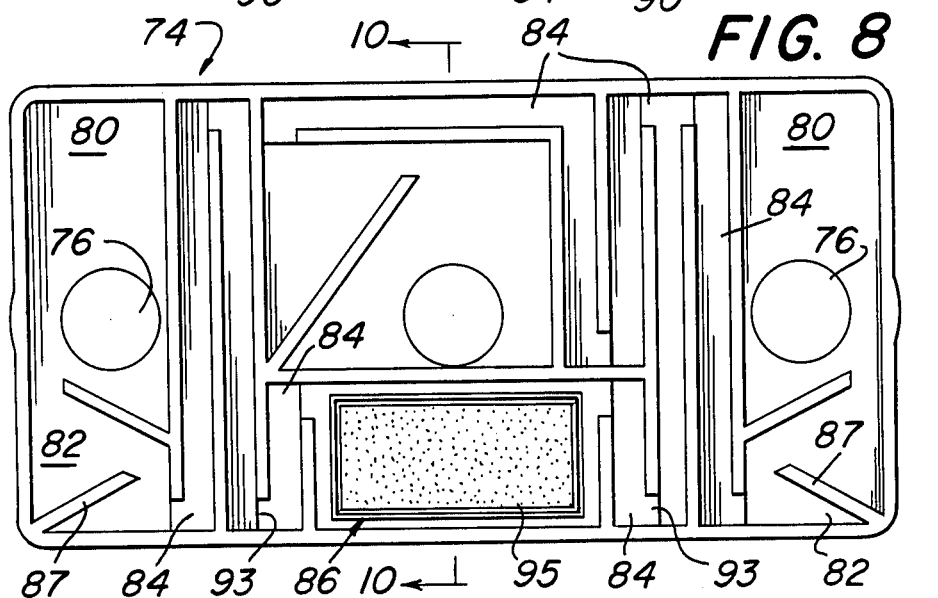
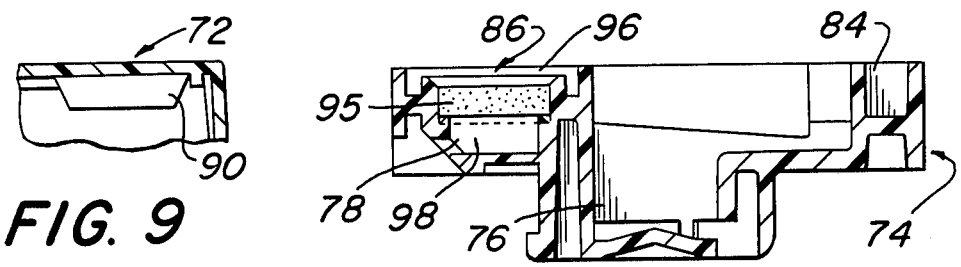

STORAGE BATTERY GANG VENT CAP

BACKGROUND OF THE INVENTION

The present invention relates generally to storage battery ventilation, and more particularly, to an improved vent cap for use in connection with motive power storage battery designs.

As a result of various chemical processes which occur when storage batteries are in use, as well as during the charging of such storage batteries, gases such as hydrogen and oxygen are often produced. Such gases are generally vented to the atmosphere in order to relieve the battery of internal pressures which could otherwise result. In performing such ventilation, the following two factors should be considered.

First, since the gases being vented are hydrogen and oxygen, care must be taken to reduce the possibility of igniting such gases. This is particularly important during battery charging, since gassing often becomes more prevalent during such periods, and since electrical connections made to the terminals of the battery can create a potential for sparks. Under such conditions battery damage can result from sparks or ignited gases reentering the battery.

Secondly, care must be taken to reduce the loss of battery electroyte through the vent, either as a result of misting which occurs in connection with battery gassing, or as a result of battery movement. Those skilled in the art recongnize that use of venting means for preservcation of electrolyte reduces the need for additional servicing procedures and often prevents electrolyte loss which may compromise the service life of the battery. However, battery electrolyte levels must still be carefully monitored and replenished, as needed.

A variety of devices have been developed in an attempt to accommodate the foregoing by providing a vent cap which proves both safer and more reliable in operation, yet lends itself to manufacture. In an effort to inhibit sparks and ignited gases from reentering the battery, some vent caps are provided with proportioned apertures or slits which are sufficiently large to enable ventilation of gases from the battery, yet which are sufficiently small to retard the passage of sparks or ignited gases. Other vent caps have been designed which incorporate a permeable venting frit through which gas may exit, but which serves as a physical barrier to sparks and ignited gases outside the vent cap.

To reduce the loss of electrolyte, vent caps are generally provided with baffles or passageways which develop relatively contorted flow paths designed to condense and facilitate the return of electrolyte collected within the vent cap to the cell of the battery with which the vent cap is associated. The design of the flow paths is central to the effectiveness of the vent cap in reducing electrolyte loss.

U.S. Pat. No. 4,517,262, issued, May 14, 1985, to Beidler and commonly assigned, discloses a vent for a storage battery which significantly contributes to the solutions of the problems outlined above.

The present invention provides improved solutions by employing a novel venting path system which enhances electrolyte retention when electrolyte pumping occurs in battery use, and concurrently offers manufacturing feasibility through simplicity of production and assembly. The present invention also teaches an improved venting system, particularly applicable for commonly venting a plurality of battery cells, which inhibits the loss of battery acid from one cell to another commonly vented cell.

SUMMARY OF THE INVENTION

It is a primary object of the present invention to provide an improved electrolyte retaining vent cap for use in connection with storage batteries.

It is also an object of the present invention to provide an electrolyte retaining vent cap for a storage battery which is capable of efficiently ventilating gases from the battery to the atmosphere.

Further, it is an object of the present invention to provide an improved venting system suitable for venting gases from a plurality of cells of a multi-cell storage battery which inhibits acid loss from one cell to another commonly vented cell.

Another object of the present invention is to provide a vent cap for a storage battery which is capable of efficiently ventilating gases to the atmosphere, and which is also capable of reducing the potential for sparks of ignited gases from reentering the storage battery through the vent cap.

Yet another object of the present invention is to provide a vent cap for a storage battery which is capable of condensing and collecting escaping electrolyte, for return to the storage battery, as experienced in electrolyte pumping during battery use.

It is also an object of the present invention to provide a vent cap for a storage battery which is efficient and reliable in operation, yet offers manufacturing feasibility.

These and other objects are achieved in accordance with the present invention by providing a vent cap having a cover and base of improved construction which defines a selectively configured hollow enclosure. A venting path is defined within the hollow enclosure which interconnects one or more battery cell ports with the venting port of the vent cap.

Associated with each battery cell port of the vent cap is a projecting battery engaging member for sealingly engaging one of the cell apertures of the storage battery. Each cell port includes a splash guard disposed between the battery cell and the cell port to retard the ingress of battery acid into the vent cap. A cylindrical condensation chamber is defined within the hollow enclosure above each cell port to trap and condense battery acid contained in the gases venting from the battery cell.

The venting pathway defined within the vent cap comprises primary and secondary acid retention chambers, a corridor system and a venting chamber. The primary acid retention chambers communicate directly with the battery cell ports. The secondary acid retention chambers communicates on one end with the respecting primary chambers and on the other end with the corridor system.

The corridor system connects each of the secondary retention chambers associated with the respective battery cell ports with the common venting chamber. The corridor system provides at least one switchback interposed between each of the secondary chambers and the venting chamber and between each of the secondary chambers themselves. Accordingly, the corridor system not only inhibits the passage of battery acid from the cell ports to the venting port but also inhibits the passage of battery acids from one cell to another of the commonly vented cells.

The venting chamber communicates at one end with the corridor system and at an opposing end with the venting port. Disposed within the venting chamber is a permeable frit which covers the venting port. The frit permits the vented gases to escape yet physically retards sparks or ignited gases from igniting the gas within the vent cap.

Generally, the floors of the retention chambers and the corridor system are configured to slope downwardly from the venting chamber toward the respective battery cell ports. Battery acid which is not deflected by the splash guard or condensed and returned to the battery cell by the condensation chamber will enter the venting pathway between the cell port and the venting chamber. Most of such battery acid will be retained in said primary retention chamber and redirected back through the cell aperture by the sloping floor of the primary chamber. Likewise, acid escaping into the second chamber and retained therein will be redirected to the primary chamber by the slope floor of the secondary chamber. Battery acid which evades retention by both retention chambers will likewise be condensed in the corridor system, particularly in view of the switchbacks designed therein, and redirected along the sloped floor of the corridor system into the respective secondary chambers of the vent cap.

In addition to the sloping floors, the retention chambers and the corridor system may also have baffles depending from the ceilings thereof to promote condensation of battery acid contained in the venting gas. Acid condensing on such baffles eventually drips to the sloping floors of the respective compartments and is redirected to drain back into the battery cell through the cell port as discussed above.

For further details regarding the present invention, references made to the following detailed description of the preferred embodiment of the invention, taking in conjunction with the following illustrations.

BRIEF DESCRIPTION OF THE DRAWINGS

FIG. 7 is a bottom view of an alternate embodiment of the vent cap cover;

FIG. 8 is a top plan view of an alternative embodiment of a vent cap base prior to assembly with the vent cap cover depicted in FIG. 7';

FIG. 9 is a cross-sectional view of the vent cap cover illustrated in FIG. 7 along 9—9;

FIG. 10 is a cross-sectional view of the vent cap base illustrated in FIG. 8 along line 10—10.

DETAILED DESCRIPTION OF A PREFERRED EMBODIMENT

Figure 1:
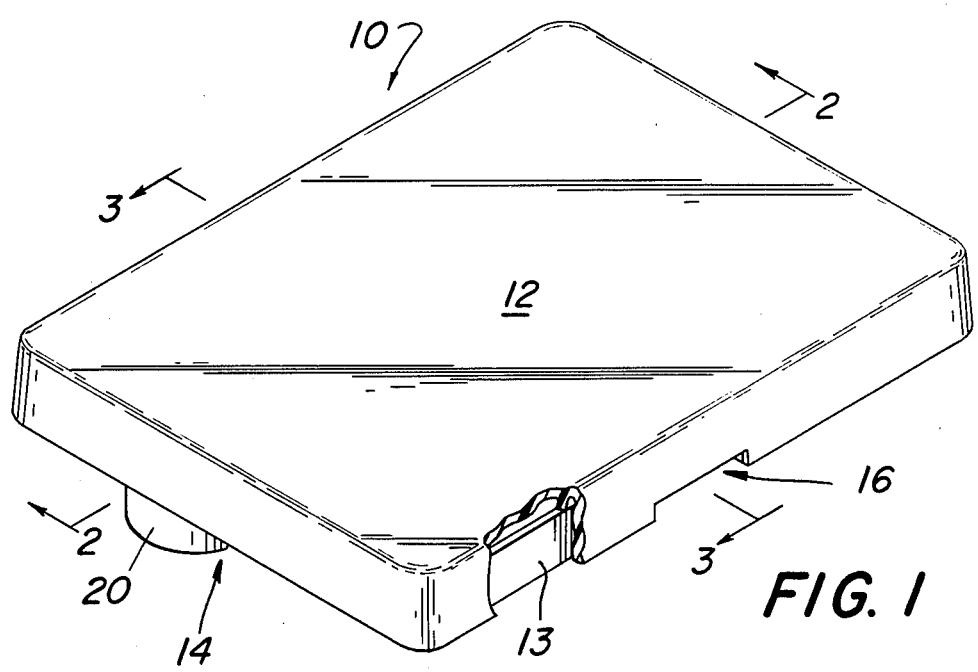
FIG. 1 is a prospective view of a vent cap made in accordance with the teachings of the present invention.

Referring to FIG. 1 there shown a gang vent cap 10 for use with a storage battery such as a conventional twelve volt, six cell lead acid battery (not shown). The vent cap comprises a cover 12 and a base 13 which define a sealed hollow body having three battery cell ports 14 and a common venting port 16. The battery cell ports 14 communicate with the venting port 16 through a selectively configured venting pathway defined in the hollow body of the vent cap.

Figure 4:
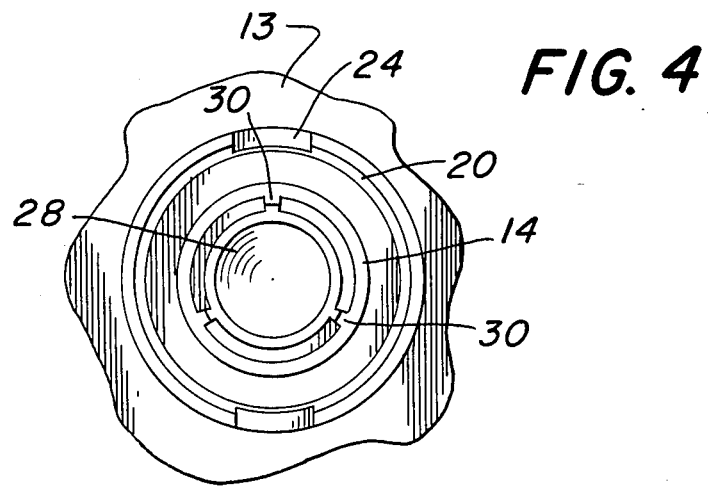
FIG. 4 is is a bottom plan view of the vent cap along the view line 4—4 as depicted in FIG. 2.
Figure 2:
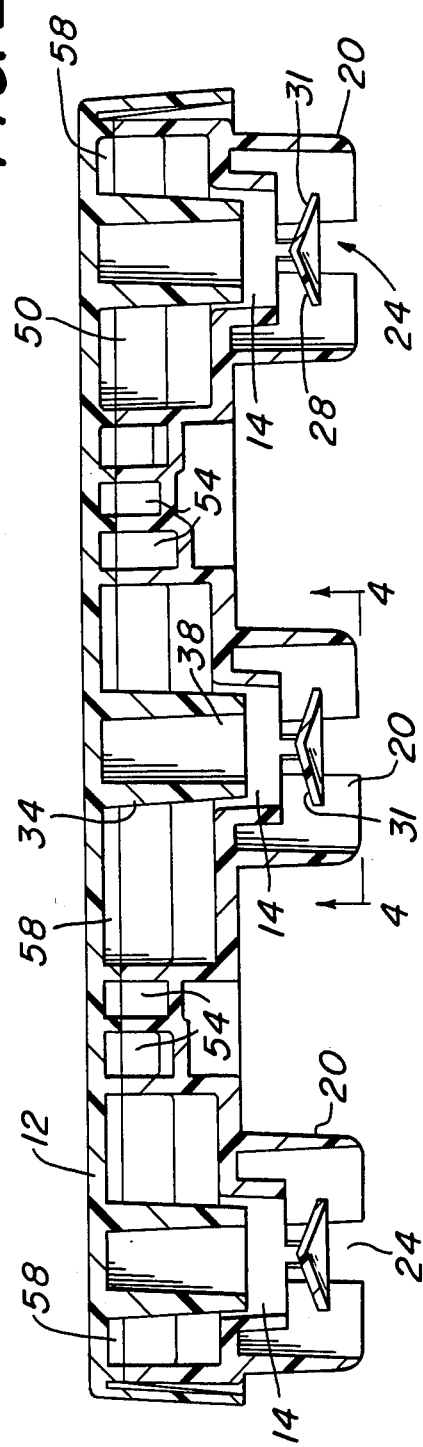
FIG. 2 is a cross-sectional view of the vent cap illustrated in FIG. 1 along line 2—2 thereof.
Figure 3:
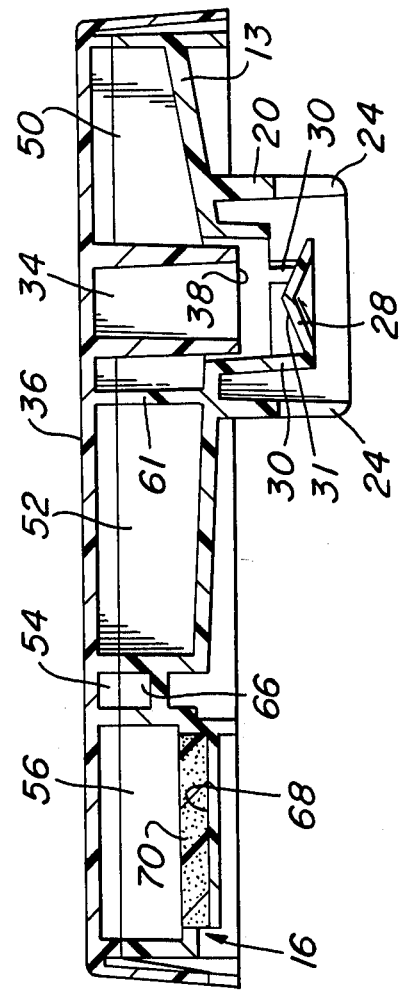
FIG. 3 is a cross-sectional view of the vent cap illustrated in FIG. 1 along line 3—3 thereof.

As best seen from FIGS. 2, 3 and 4, the battery cell ports are each associated with a conventional cylindrical battery cell engaging member 20 which is selectively configured for sealingly engaging respective cell apertures of a storage battery. The sealing members 20 project from the base 13 of the vent cap and have opposing slits 24 defined therein to facilitate insertion of the sealing members 20 into the respective cell aperture of a storage battery. Cell port location and the size, spacing and alignment of the sealing members 20 are selected to correspond with the size, spacing and alignment of the cell apertures in the storage battery for which the vent cap is intended to be used.

A splash guard 28 is suspended directly below the battery cell port 14 on three legs 30. When the vent cap is in use, the splash guard is disposed between the acid contained in the battery cell and the battery cell port 14 thereby impeding the ingress of battery acid into the vent cap. The splash guard 28 is shaped as an inverted cone. Accordingly, battery acid splashing upwardly towards the port 14 is blocked by the splash guard 28 and directed downwardly by its conical shape. Acid which travels beyond the splash guard will drain back into the cell and will not collect or pool on the top side 31 of the conical splash guard 28.

A cylindrical condensation chamber 34 is provided for each cell port 14 for further inhibiting the ingress of battery acid into the gas ventilation path, see FIG. 3. Each cylindrical condensation chamber 34 depends from the cover 12 of the vent cap such that its open end 38 is disposed within the respective cell port 14. The condensation chambers 34 capture much of the acid and acid mist which enters the ports 14 and redirects the acid back into the respective battery cells.

Figure 5:
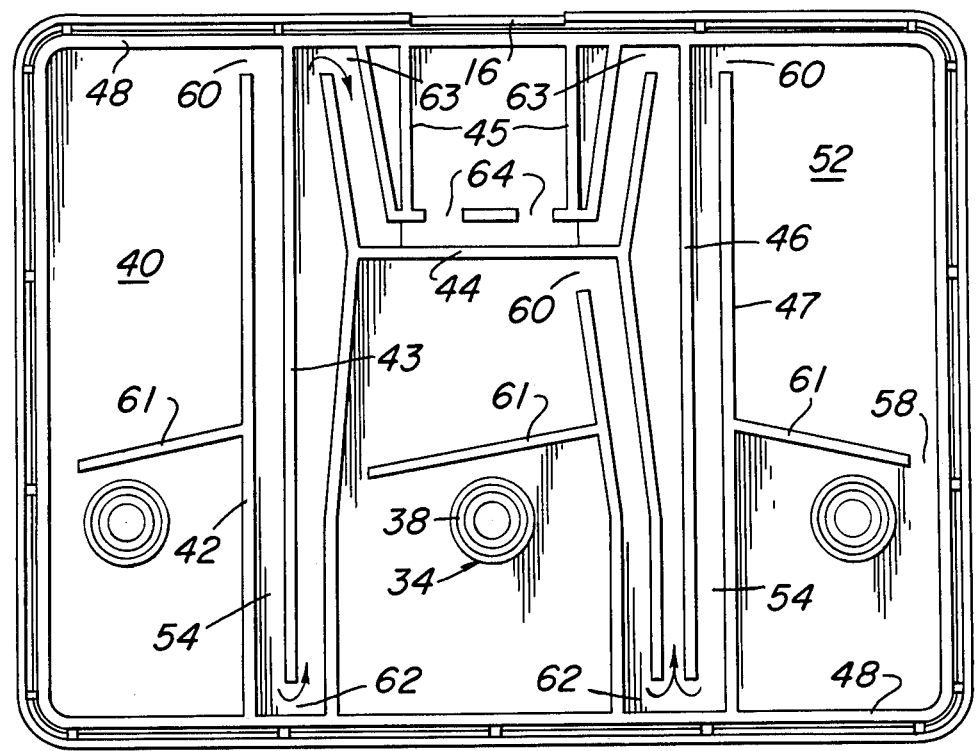
FIG. 5 is a bottom view of the vent cap cover prior to assembly with the vent cap base of FIG. 6 to form the vent cap depicted in FIG. 1.
Figure 6:
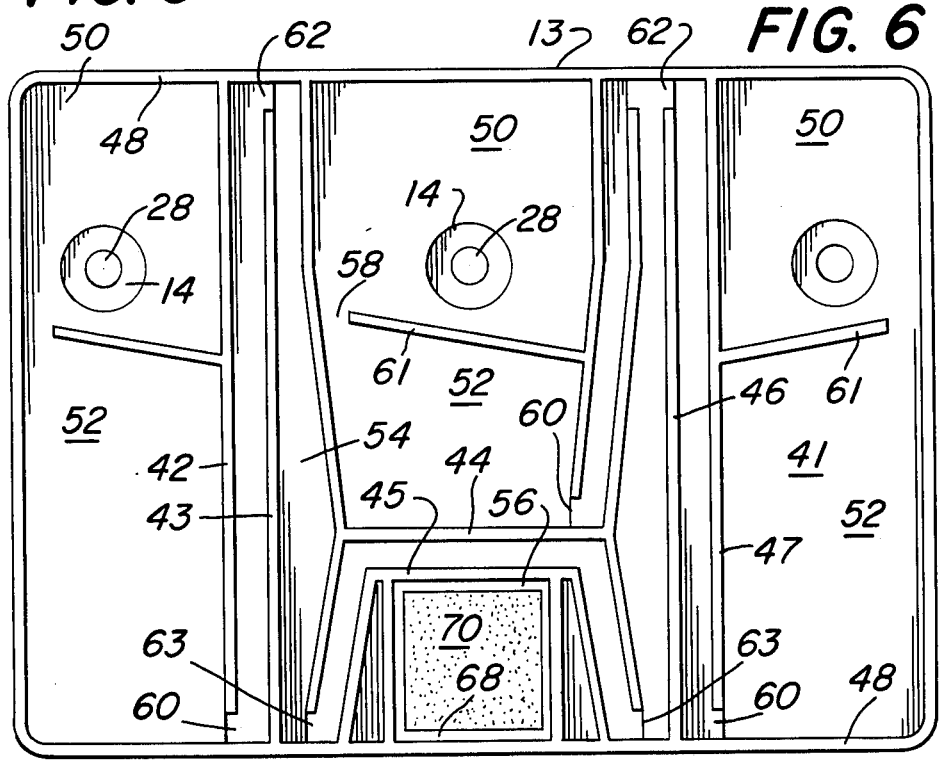
FIG. 6 is a top view of the vent cap base prior to assembly with the vent cap cover depicted in FIG. 5 to form the vent cap depicted in FIG. 1.

As best seen in FIGS. 5 and 6, the flow path for the venting gas from the cell ports 14 to the venting port 16 is designed to minimize the potential for battery acid to travel from the cell ports 14 to the venting port 16 and also to limit acid migration among the individual cell ports. The vent cap body is preferably manufactured in two pieces, the cover 12 and the base 13 which are molded into select configurations from an appropriate material such as polypropylene or the like.

The bottom 40 of the cover 12 and the top 41 of the base 13 have selectively configured and corresponding projections 42, 43, 44, 45, 46, 47, 48 which are joined to define the walls of the various compartments within the hollow chamber defined by the assembly of the cover 12 with the base 13. The two pieces 12, 13 are joined through conventional techniques such as sonic welding or with a hot platen such that a sealed enclosure is defined connecting the cell ports 14 with vent port 16.

The sealed pathway which is defined between the cell ports 14 and the venting port 16 includes primary and secondary acid retention chambers 50, 52 which are connected via a corridor system 54 to a venting chamber 56 which has the vent port 16 defined therein. After the cover 12 is joined with the base 13, the bottom 40 of the cover 12 forms the ceiling of the respective compartments 50, 52, 54, 56 defined within the enclosure and the top 41 of the base 13 defines the floor of the respective compartments.

A primary acid retention chamber 50 is associated with each of the cell ports 14. As best shown in FIG. 3, the floors of the primary acid retention chambers 50 are sloped towards the venting port 14 so that acid which is retained within the chamber is directed back through the port 14 into the respective battery cell. The primary chambers 50 are generally rectangular having an opening 58 defined in one corner thereof communicating with a secondary retention 52 chamber associated with each of the primary chambers 50.

The secondary retention chambers 52 are also generally rectangular having a first opening 58 proximate one corner in communication with the respective primary retention chamber 50 and a second opening 60 proximate the opposite corner communicating with the corridor system 54. As shown in FIG. 3, the floors of the secondary chambers 52 are sloped towards the wall 61 which divides the primary and secondary chambers 50, 52. As shown in FIGS. 5 and 6, the dividing walls 61 between the primary and secondary chambers 50, 52 are slanted so that the first openings 58 of the secondary chambers are at the lowest point on the floor of those chambers. Accordingly, battery acid which is captured in any one of the secondary chambers 52 drains in to the associated primary chamber 50 and is returned to the battery cell as described above.

The commonly connected corridor system 54 provides a flow path from the respective secondary retention chambers 52 to the venting chamber 56. The corridor system 54 is designed with switchbacks 62, 63 which further impede travel of battery acid through the venting passageway of the vent cap. In order for gas to escape from any one of the second retention chambers 52 to the venting chamber 56, the gas must traverse around two switchbacks 62, 63 and travel a distance at least twice as great as the combined length of the primary and secondary chambers within the corridor systems. Moreover, there is at least one complete corridor switchback 62 separating each of the secondary retention chambers 52 from the others so that intercell battery acid redistribution is inhibited.

The floor of the corridor system 54 is sloped downwardly from the venting chamber 56 to the respective secondary chambers 52. Again, the sloping serves to redirect any battery acid which escapes into the corridor system back into the respective cells of the battery.

The venting chamber 56 has two openings 63 communicating with corridor system which are elevated above the highest point 66 of the floor of the corridor system 54, see FIGS. 3, 5, and 6. This is accomplished by providing the venting chamber openings 63 in the vent chamber wall portions 45 molded into the vent cap cover 12 and not in the wall portions 45 molded into the vent cap base 13.

The venting chamber 56 is generally square and has a recessed area 68 (FIG. 3) defined in the floor thereof. The venting port 16 is defined along the length of one of the edges of the recessed floor area 68. Frit materials 70 such as fritted polypropylene is cut to conform with the recessed area 68 and is inserted therein into the molded base 13 completely covering the venting port 16. Accordingly, gas venting from the chamber through the venting port must pass through the permeable frit 70 which is secured in the recess by a compression fit.

The frit 70 retards sparks or ignited gas outside the vent cap enclosure from igniting the gas within the vent cap. In the preferred embodiment, a 0.70 inch square of fritted polypropylene, 0.15 inches thick, is used which has an open volume of 40%, a back pressure rate of 3-17 cm. $H_2O$, and an air flow rate 8000 cc. per minute, per square inch. The venting port covered by this frit is rectangular being approximately 0.65 inches by 0.04 inches.

In practice, two of the inventive vent caps would be installed on a standard 12 volt storage battery having 6 cells. Each vent cap would be placed in sealing engagement with three of the battery cells for venting cell gases through the respective venting chambers of the two vent caps. Gas vented from the cells will flow past the splash guard 28, through the battery cell port 14, past the cylindrical condensation chamber 34 and into the primary acid retention chamber 50. Thereafter, the gas will pass through the secondary acid retention chamber 52 and the corridor system 54, and into the venting chamber 56. Finally, the gas will be vented from the venting chamber 56 by passing through the permeable frit 70 and escaping to the atmosphere from the venting port 16.

Battery acid which enters the venting pathway, either through electrolyte pumping, splashing or as mist, is substantially removed from the venting gases as they travel through the venting path defined through the inventive vent cap. Moreover, the acid which does work its way into the venting pathway is redirected by the sloping floor system into the cell from which it emanated. The disclosed gang vent cap particularly inhibits not only loss of battery acid through venting but also battery acid loss from one cell to another commonly vented cell.

Referring to FIGS. 7-10 there is shown an alternate embodiment of a cover 72 and base 74 for the vent cap made in accordance with the teachings of the present invention. As with the first embodiment, the cover and base are joined together to form a sealed enclosure defining a selectively configured sealed pathway between cell ports 76 and venting port 78. As in the first embodiment, the sealed pathway includes primary and secondary acid retention chambers 80, 82 which are connected via a corrider system 84 to a venting chamber 86 which has the vent port 86 definded herein. In the alternate embodiment, the secondary acid retention chambers 82 associated with the two end cell ports 76 contain a dividing wall 87 which further facilitates the retardation of acid flow from the cell ports through the sealed pathway.

As shown in FIGS. 7 and 9, in order to further inhibit and impede the escape of battery acid, trapezoidal baffling partitions 90 are defined in the cover 72 of the vent cap. When the cover 72 is assembled with the base 74, the baffles 90 project from the ceiling corridor walls defined in the cover 72 into the corridors 84 defined in the base 74 at each of the switchbacks and turns at the last turn in the corridor system 84 before communication with the venting chamber 86, the corridor wall portions 92 defined in the vent cover 72 are formed as continous pieces which function as baffles, but which do not depend into the base corridor at the last corridor switchbacks 93. Baffles 90 also project from the ceiling within the primary and secondary retention chambers 80,82.

The baffles 90 enhance the functionality of those compartments since battery acid suspended within the venting gases will tend to colelect on the ceiling baffles 90, drop to the floor of the respective compartments, and accordingly, be redirected to the respective battery cells.

As can be best seen in FIG. 10, the venting chamber 86 is selectively figured to permit the seating of a permeable frit intermediate the venting chamber 86 accordingly, the venting chamber 86 is divided by the frit 95 into an upper chamber portion 96 which communicates directly with the corridor system 84 and a lower chamber portion 98 which communicates with the atmosphere via venting port 78. In the event gaseous acid venting through port 78 becomes ignited, the ignition of escaping gases is contained within the lower poriton 98 of the venting chamber 86.

We claim:

1. A gang vent cap for commonly venting a plurality of cell apertures of a storage battery comprising:
   (a) a selectively configured sealed enclosure having a venting port and at least two battery cell ports communicating with the interior of said enclosure;
   (b) means associated with each said battery cell port for sealingly engaging a cell aperture of the storage battery;
   (c) a venting path defined within said enclosure between said battery cell ports and said venting port including:
      (i) retention chamber means in communication with each said battery cell port;
      (ii) a common venting chamber communicating with said venting port; and
      (iii) corridor system means having a plurality of switchbacks connecting said retention chamber means with said venting chamber such that at least one corridor switchback is between each retention chamber means and said venting chamber and such that at least one switchback is between each of the retention chamber means themselves.

2. A gang vent cap according to claim 1 further comprising:
   semi-permeable frit means disposed within said venting chamber dividing said venting port from said venting path for inhibiting the ingition of gas within said enclosure.

3. A gang vent cap according to claim 1 further comprising:
   splash guard means associated with each said battery cell port for impeding the ingress of battery acid into said enclosure through said cell ports.

4. A gang vent cap according to claim 1 further comprising:
   cylindrical condensation chamber means associated with each said battery cell port for trapping and condensing battery acid contained in the gases venting from the battery cell through the respective cell port.

5. A gang vent cap according to claim 1 further comprising:
   baffle means projecting from the ceiling of said retention chambers and said corridor system means for condensing and impeding the travel of battery acid through said venting path whereby battery acid which condenses on said baffles and is redirected to said respective cell ports.

6. A gang vent cap according to claim 1 wherein each said retention chamber means comprises:
   (a) a primary acid retention chamber communicating with the respective cell port;
   (b) a secondary retention chamber having first and second openings defined therein at opposite ends thereof;
   (c) said secondary chamber communicating with said primary chamber via said first opening; and
   (d) said secondary chamber communicating with said corridor system means via said second opening.

7. A gang vent cap according to claim 5 wherein:
   (a) the floor of each primary chamber is sloped downwardly toward its associated cell port;
   (b) the floor of said secondary chambers are sloped downwardly from said second openings toward said respective first openings; and
   (c) the floor of said corridor system means is sloped downwardly from said venting chamber towards said respective second openings of said secondary chambers.

8. A gang vent cap according to claim 7 further comprising:
   baffle means projecting from the ceiling of said retention chambers and said corridor system means for condensing and impeding the travel of battery acid through said venting path whereby battery acid which condenses on said baffles is redirected to said respective cell ports.

9. A gang vent cap according to claim 8 further comprising:
   semi-permeable frit means disposed within said venting chamber dividing said venting port from said venting path for inhibiting the ignition of gas within said enclosure.

10. A gang vent cap according to claim 9 further comprising:
    (a) splash guard means associated with each said battery cell port for impeding the ingress of battery acid into said enclosure through said cell ports; and
    (b) a cylindrical condensation chamber means associated with each said battery cell port for trapping and condensing battery acid contained in the gases venting from the battery cell through the respective cell port.

11. A vent cap for a storage battery comprising:
    (a) a selectively configured sealed enclosure including a venting port and at least one battery cell port communicating with the interior of said enclosure;
    (b) means associated with each said battery cell port for sealingly engaging a cell aperture of the storage battery;
    (c) a venting path defined within said enclosure between each said battery cell port and said venting port including:
       (i) a primary acid retention chamber communicating with said battery cell port;
       (ii) a secondary acid retention chamber having first and second openings defined therein at opposite ends thereof;
       (iii) said secondary chamber communicating with said primary chamber through said first opening;
       (iv) a venting chamber communicating with said venting port;
       (v) said venting chamber including means for inhibiting the ignition of gas within said enclosure associated with said venting port; and
       (iv) corridor system means having at least one switchback connecting the second opening defined in said secondary chamber with said venting chamber such that at least one switchback is between said secondary chamber and said venting chamber.

12. A vent cap according to claim 11 wherein:
a semi-permeable polypropolene frit disposed within said venting chamber dividing said venting port from said venting path comprises said means for inhibiting the ignition of gas within said enclosure.

13. A vent cap according to claim 11 further comprising:
splash guard means associated with said battery cell port for impeding the ingress of battery acid into said enclosure through said cell port.

14. A vent cap according to claim 11 further comprising:
cylindrical condensation chamber means associated with said battery cell port for trapping and condensing battery acid contained in the gases venting from the battery cell through the cell port.

15. A vent cap according to claim 11 wherein:
(a) the floor of the primary chamber is sloped downwardly toward its associated cell port;
(b) the floor of the secondary chamber is sloped downwardly from its second opening toward its first opening; and
(c) the floor of said corridor system means is sloped downwardly from said venting chamber towards the second opening of each secondary chamber.

16. A vent cap according to claim 15 further comprising:
baffle means projecting from the ceiling of said retention chambers and said corridor system means for condensing and impeding the travel of battery acid through said venting path whereby battery acid which condenses on said baffles is redirected to said cell port.

17. A vent cap according to claim 11 for commonly venting a plurality of cell apertures of a storage battery wherein:
(a) said selectively configured sealed enclosure includes at least two battery cell ports; and
(b) said corridor system means commonly connects each said secondary chamber with said venting chamber such that at least one switchback is between each of the commonly vented secondary chambers.

18. A vent cap according to claim 17 wherein:
(a) the floor of each primary chamber is sloped downwardly toward its associated cell port;
(b) the floor of said secondary chambers are sloped downwardly from said second openings toward said respective first openings; and
(c) the floor of said corridor system means is sloped downwardly from said venting chamber towards said respective second openings of said secondary chambers.

19. A vent cap according to claim 18 further comprising:
baffle means projecting from the ceiling of said retention chambers and said corridor system means for condensing and impeding the travel of battery acid through said venting path whereby battery acid which condenses on said baffles is redirected to said respective cell ports.

20. A vent cap according to claim 19 wherein:
a semi-permeable polypropylene frit disposed within said venting chamber dividing said venting port from said venting path comprises said means for inhibiting the ignition of gas within said hollow enclosure.

21. A vent cap according to claim 20 further comprising:
splash guard means associated with each said battery cell port for impeding the ingress of battery acid into said enclosure through said port.

22. A vent cap according to claim 21 further comprising:
cylindrical condensation chamber means associated with each said battery cell port for trapping and condensing battery acid contained in the gases venting from the battery cell through the respective cell port.

23. A vent cap for a storage battery comprising:
(a) a selectively configured enclosure including a venting port and at least one battery cell port communicating with the interior of said enclosure;
(b) means associated with each said battery cell port for sealingly engaging a cell aperture of the storage battery;
(c) splash guard means associated with each said battery cell port for impeding the ingress of battery acid into said enclosure through said port;
(d) cylindrical condensation chamber means communicating with said battery cell port for trapping and condensing battery acid contained in the gases venting from the battery cell through the battery port;
(e) a venting path defined within said enclosure between each said battery cell port and said venting port including:
(i) a primary acid retention chamber communicating with said battery cell port;
(ii) a secondary acid retention chamber having first and second openings defined therein at opposite ends thereof;
(iii) said secondary chamber communicating with said primary chamber through said first opening;
(iv) a venting chamber communicating with said venting port;
(v) said venting chamber including a permeable frit dividing said venting port from the venting path for inhibiting the ignition of gas within said hollow enclosure; and
(vi) corridor means having at least two switchbacks and a length at least twice the combined length of said primary and secondary chambers connecting said second opening defined in said secondary chamber with said venting chamber;
(f) said enclosure being sealed such that gas venting from a battery cell through said vent cap travels around said splash guard, through said battery cell port, through said primary chamber, through said secondary chamber, through at least two switchbacks of said corridor means for a distance equal to at least twice the combined length of said primary and secondary chambers, into said venting chamber, through said frit, and then vents through said venting port.

24. A vent cap according to claim 25 for commonly venting a plurality of cell apertures of a storage battery wherein:
(a) said selectively configured sealed enclosure includes at least two battery cell ports; and
(b) said corridor system means commonly connects each said secondary chamber with said venting chamber such that at least one switchback is between each of the commonly vented secondary chambers.

25. A vent cap according to claim 24 wherein:
(a) the floor of each primary chamber is sloped downwardly toward its associated cell port;
(b) the floor of each said secondary chamber is sloped downwardly from its second opening toward its first opening; and
(c) the floor of said corridor system means is sloped downwardly from said venting chamber towards said respective second openings of said secondary chambers.

26. A vent according to claim 25 further comprising: baffle means projecting from the ceiling of said retention chambers and said corridor system means for condensing and impeding the travel of battery acid through said venting path whereby battery acid which condenses on said baffles is redirected to said respective cell ports.